United States Patent
Hernandez

(10) Patent No.: US 6,945,564 B2
(45) Date of Patent: Sep. 20, 2005

(54) EXPENSE RECEIPT DIARY WITH ADHESIVE STRIP

(76) Inventor: Roberto Hernandez, 6760 SW. 17th St., Miami, FL (US) 33155

( * ) Notice: Subject to any disclaimer, the term of this patent is extended or adjusted under 35 U.S.C. 154(b) by 47 days.

(21) Appl. No.: 10/189,657

(22) Filed: Jul. 3, 2002

(65) Prior Publication Data

US 2003/0030269 A1 Feb. 13, 2003

Related U.S. Application Data

(60) Provisional application No. 60/311,585, filed on Aug. 10, 2001.

(51) Int. Cl.$^7$ .......................... B42D 15/00; B42D 11/00; B42D 19/00
(52) U.S. Cl. ........................... 283/63.1; 283/30; 283/51; 283/60.1; 283/60.2; 283/61; 283/64.1; 283/66.1; 283/101; 283/116; 206/450; 206/460; 40/124; 40/360; 40/372; 281/5; 281/9; 281/12; 428/40.1; 428/41.7; 428/41.8; 428/42.2
(58) Field of Search ........................ 283/30, 60.1, 60.2, 283/61, 51, 63.1, 64.1, 66.1, 101, 116, 6.1, 6.2; 281/9, 12; 40/124, 360, 372, 102; 206/450, 460; 428/40.1, 41.7, 42.2, 41.8

(56) References Cited

U.S. PATENT DOCUMENTS

| | | | | |
|---|---|---|---|---|
| 522,171 A | * | 6/1894 | Harlingen | 40/391 |
| 683,632 A | * | 10/1901 | Wright | 281/15.1 |
| 2,136,186 A | * | 11/1938 | Frost | 281/29 |
| 2,687,902 A | * | 8/1954 | Becker | 229/67.1 |
| 3,043,734 A | * | 7/1962 | Porter | 156/249 |
| 3,503,835 A | * | 3/1970 | Herman | 428/42.2 |
| 3,620,891 A | * | 11/1971 | Jones et al. | 428/42.2 |
| 3,669,555 A | * | 6/1972 | Holes et al. | |
| 3,740,879 A | * | 6/1973 | Patterson | 40/388 |
| 4,116,470 A | * | 9/1978 | Johnsen | 283/66.2 |
| 4,643,455 A | * | 2/1987 | North et al. | 283/81 |
| 4,645,077 A | * | 2/1987 | McLaughlin et al. | 206/449 |
| 5,030,491 A | * | 7/1991 | Shoesmith | 428/42.2 |
| 5,338,068 A | | 8/1994 | Arbach et al. | |
| 5,342,094 A | * | 8/1994 | Duck-Spann | 283/81 |
| 5,438,378 A | * | 8/1995 | Blatter | 351/47 |
| 6,000,724 A | * | 12/1999 | Holway | 283/66.1 |
| 6,171,008 B1 | * | 1/2001 | Ochsner | 402/79 |
| 6,349,971 B2 | * | 2/2002 | McCarthy | 283/101 |

OTHER PUBLICATIONS

Dome® Expense Account Diary manufacturing by Dome Publishing Co., 10 New England Way, Warwick, RI 02886, USA. (online catalog reference attached).

Dome® Auto Mileage Log And Expense Records manufactured by Dome Publishing Co., 10 New England Way, Warwick, RI 02886, USA. (online catalog reference attached).

* cited by examiner

Primary Examiner—Derris Banks
Assistant Examiner—Mark Henderson

(57) ABSTRACT

An expense receipt diary of a notebook-type (10) consisting of a front cover (12), a back cover (14), and a plurality of interior pages (16), secured together by binding (18) on one side. The front of each interior page (16) consists of a mounting area (24) that contains a plurality of adhesive strips (28). Each strip (28) is comprised of a release liner (30) and an underlying adhesive (32). Receipts (34a) may be attached to the underlying adhesives (32) by removing the liners (30) and pressing the receipt (34b) onto the exposed adhesives (32). The recording area (20) is located on the reverse side of the mounting area (24). The recording area (20) is a printed surface where the employee can record details pertaining to the receipts attached (34b) to the mounting area (24) of the same sheet.

10 Claims, 2 Drawing Sheets

FIG. 2

EXPENSE RECEIPT DIARY WITH ADHESIVE STRIP

CROSS REFERENCE TO RELATED APPLICATIONS

This application is entitled to the benefit of Provisional Patent Application Ser. No. 60/311,585 filed Aug. 10, 2001.

FEDERALLY SPONSORED RESEARCH

Not Applicable.

SEQUENCE LISTING OR PROGRAM

Not Applicable.

BACKGROUND-DISCUSSION OF PRIOR ART

Employees of businesses routinely incur individual expenses, commonly referred to as "Travel and Entertainment" (T & E) costs. These expenses usually relate to airfare, hotels, client lunches, seminars, transportation, and many others. Meticulous recording and tabulation of these expenses is required for monitoring the costs of doing business and for income tax purposes.

Typically, businesses monitor T & E costs by requiring their employees to tally these expenses on a daily basis. The employee is usually required to gather all receipts and to report the expenses by category on a summary form. This summary form may be created manually but it is typically created using commercially available computer software such as a spreadsheet program. The receipts are then submitted to the accounting department along with the summary form. The summary form with all receipts attached is typically referred to as an "expense report." If the employee used personal monies or personal credit to fund any purchases, the accounting department would review the expense report for accuracy and would reimburse the employee the dollar amount.

Receipts for purchases range in size from small ticket stubs to full size sheets of paper. As a result, businesses typically standardize the expense reporting process by requiring their employees to attach each receipt to a standard size sheet of paper by using glue or tape. In the case of small receipts, several may be attached to one sheet of paper. There are several reasons for this practice. First, if needed, it allows the employee or the accounting department to be able to easily make photocopies of the receipts without having to handle each receipt separately. Second, it reduces the chances of misplacing the receipts while the expense report navigates the expense reimbursement process. Third, this practice allows the accounting department to audit each receipt without the inconvenience of having to handle loose receipts of many different sizes and shapes. Finally, once the accounting department processes the expense report, the summary form and the accompanying receipts can be conveniently stored in standard size filers or binders.

Several business forms and diaries have been devised which provide a diary for recording expenses combined with a pocket for storing tickets and receipts. For example, U.S. Pat. No. 5,338,068 of Arbach et al (1994) discloses an integrated expense summary form and receipt storage pocket. The complex form includes an area with a printed table for summarizing expense activities. The form can be folded into an envelope that can be used to store receipts. The envelope containing the receipts may then be submitted to the accounting department for processing.

Also, commercially available diaries for recording expenses are Dome® Publishing Co.'s products titled Dome® Expense Account Diary and Dome® Auto Mileage Log And Expense Records. Both are wire bound notebooks containing sheets with printed tables which are designed for recording individual expense related activities. Both products also include an open pocket for storing tickets and receipts.

None of the available forms and diaries is equally convenient for all aspects of the expense record keeping process and subsequent expense reimbursement process. All forms and diaries heretofore known suffer from a number of disadvantages:

The use of a pocket to store or retain receipts acts as a hindrance to the expense reimbursement process because it requires the accounting department to manually handle and sort individual receipts in order to verify that the employee has submitted all the required documentation with the expense summary. Manually handling each receipt increases the possibility that one may be damaged or misplaced.

The use of a pocket increases the possibility that receipts may be lost by the employee or by the accounting department if the pocket is not sealed correctly.

Submitting loose receipts to the accounting department impedes the photocopying process because each receipt must be handled individually.

Expense recording sheets, such as those included in the Dome® products, are not intended to be submitted to the accounting department as an expense report because they do not include a summary tabulation. Therefore, while these products can be used as expense diaries, they do not eliminate any of the steps required to create and submit a typical business expense report.

Diaries with only one pocket included, such as the Dome® products, are not intended to be submitted to the accounting department because were the pocket to be detached from the diary and submitted with an expense report the employee would no longer have a place to store the receipts recorded in the future.

Diaries, such as the Dome® products, are odd shaped and not designed for storage in standard size filers or binders.

The available forms and diaries do not easily complement the practice of attaching receipts to standard size sheets of paper.

OBJECTS AND ADVANTAGES

Accordingly, several objects and advantages of the present invention are, for example:

- to provide a more convenient and secure system for collecting individual tickets or receipts;
- to provide an expense activity diary where expenses can be categorized for each individual receipt;
- to provide an expense activity diary which complements the practice of attaching receipts to standard size sheets of paper;
- to provide a system for collecting, categorizing, and attaching expense receipts to standard size sheets of paper, which does not require an additional process or product;
- to provide a system which facilitates expense report processing by eliminating wasted effort such as manual handling of individual receipts by the accounting department;
- to provide a more convenient means for photocopying small and odd shaped receipts;
- to provide a means of collecting receipts which can be conveniently stored in standard size filers or binders; and to provide an expense activity diary which is simple to use and inexpensive to manufacture.

SUMMARY

A diary or notebook comprising a front cover, a back cover, and a plurality of interior pages bound at one edge, with a plurality of adhesive strips covered by release; liners disposed on one surface, and a form for recording business information printed on the reverse side of said surface.

DRAWINGS

Drawing Figures

FIG. 2 is a front view of the diary in FIG. 1 open to expose two interior pages.

REFERENCE NUMERALS IN DRAWINGS

Figure 1:
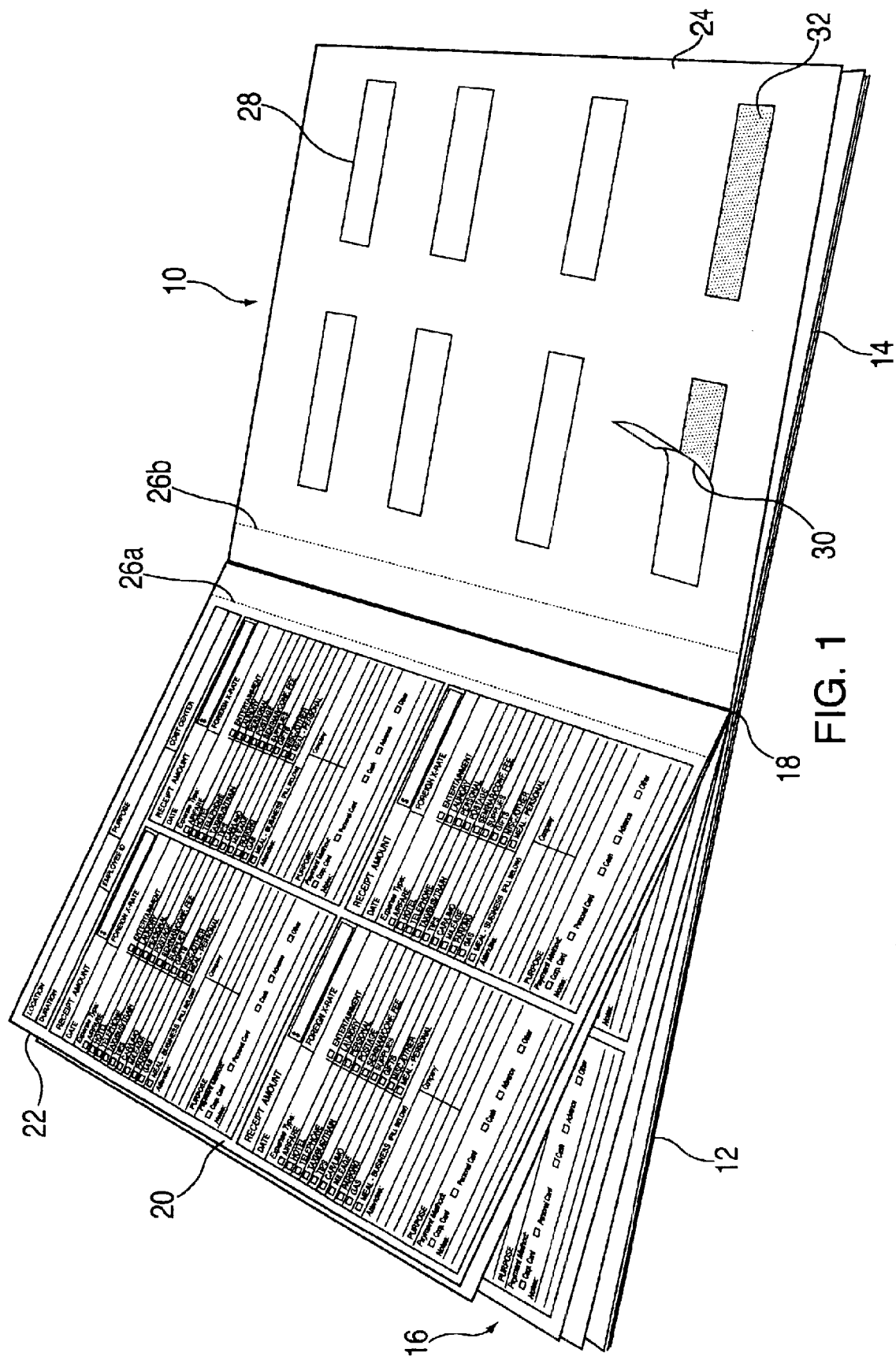
FIG. 1 is a perspective view of a typical embodiment of the present invention opened to expose two interior pages.

10: notebook-type expense receipt diary
12: front cover
14: back cover
16: interior pages
18: binding
20: data recording area
22: back of each interior page
24: mounting area
26a: perforated edge as seen from the data recording area side of each page
26b: perforated edge as seen from mounting area side of each page
28: adhesive strip
30: release liner
32: underlying adhesive
34a: receipt to be attached
34b: attached receipt.

DETAILED DESCRIPTION

Figure 2:
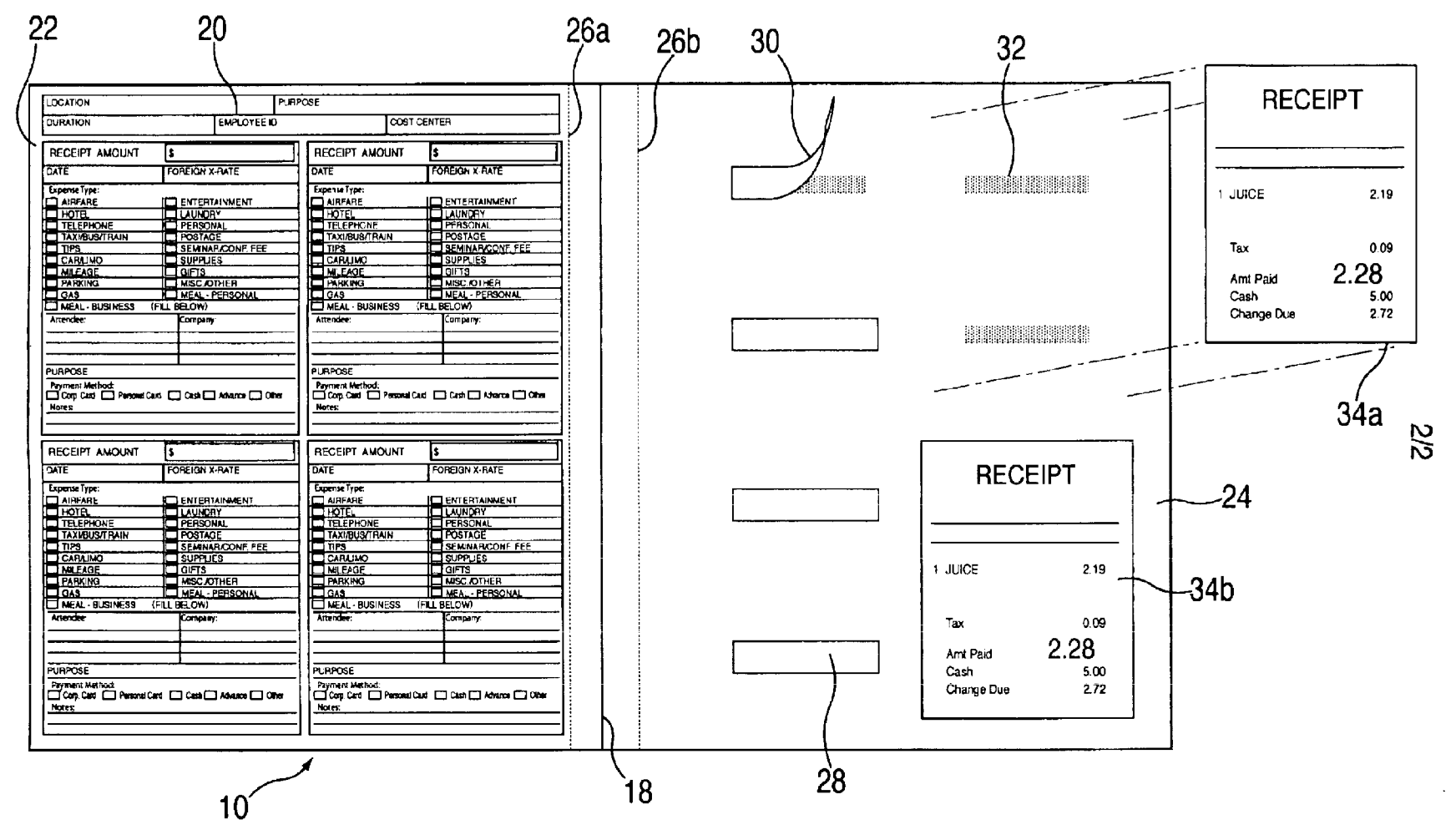

Description—FIGS. 1 and 2—Preferred Embodiment

Though FIGS. 1 and 2 show specific formats, the present invention is not limited to the formats illustrated here.

FIGS. 1 and 2 are illustrations of an expense receipt diary of a notebook-type 10 open to reveal two interior pages. The expense diary 10 consists of a front cover 12 and a back cover 14 of any material, secured together by binding 18 that allows the covers and the interior pages 16 to be freely turned.

Each interior page 16 is made of a single sheet of paper. The front of each interior page 16 consists of a mounting area 24 that contains a plurality of adhesive strips 28. Each adhesive strip 28 is comprised of a release liner 30 and an underlying adhesive 32. The mounting area 24 holds the receipts 34b that are attached to the underlying adhesives 32.

The data recording area 20 is located on the reverse side of the mounting area 24, which is the back of each interior page 22. The data recording area 20 is a printed surface where the employee can record details pertaining to the receipts attached to the mounting area 34b of the same sheet. In the example illustrated in FIG. 2, the recording area 20 of one sheet is shown imprinted with fields that may be used to record the receipt amounts, checkboxes for categorizing the receipts by various expense types, and other fields for recording additional information. Also shown is the mounting area 24 of the adjacent interior page 16. The mounting area 24 contains eight adhesive strips 28 which may be exposed to attach receipts 34a. However, the mounting area 24 of each interior page 16 may contain more or less adhesive strips 28.

Once the mounting area 24 of an interior page 16 is covered with attached receipts 34b, said page and the corresponding page with recorded data 20 may be separated from the diary by tearing the page along the perforation 26a, 26b. The perforation 26a, 26b is on the side of each sheet closest to the binding 18.

Operation—FIGS. 1 and 2

The functions of the components of the invention are:

the interior pages 16 provide a surface upon which the adhesive strips 28 can be applied on the mounting surface side 24 and the data recording area 20 can be imprinted on the reverse side 22;

the binding 18 allows the front cover 12, back cover 14, and the interior pages 16 to be turn freely;

the mounting area 24 provides a surface upon which the adhesive strips 28 may be applied and the receipts may be attached 34b;

the release liner 30, a material specially treated so as to be easily removed from the underlying adhesive 32, covers the underlying adhesive 32. The release liner 30 prevents adjacent interior pages 16 from becoming attached to the underlying adhesives 32 when the expense diary 10 is closed;

the underlying adhesive 32 simultaneously adheres to both the mounting surface 24 and the receipt to be attached 34a;

the recording area 20 provides a place for the user to record information pertaining to the receipts attached 34b to the mounting area 24 on the reverse side of the page; and the perforated edge 26a, 26b allows the user to easily and conveniently separate each page 16 from the expense diary 10.

The manner of using the expense receipt diary is simple and straightforward, comprising:

selecting the receipts 34a to be attached to the diary;

selecting the interior page 16 to be used for attaching the receipts 34a;

removing as many release liners 30 as is necessary to securely attach the receipts 34a to the page. The release liners 30 are removed by prying up the edge of the liner 30 with a fingernail or other device and pulling the liner 30 away from the surface of the underlying adhesive 32. This action will expose the underlying adhesive 32. The release liners 30 may then be discarded;

pressing the receipts 34a onto the exposed adhesives;

continuing to add receipts to the page until there is no additional space on the mounting surface 24 for attaching more receipts 34a, or until all the underlying adhesives 32 have been covered by attached receipts 34b, or until all available expense receipts have been attached;

if necessary, according information pertaining to the attached receipts 34b on the data recording area 20 printed on the reverse side of the same page. The information may include but is not limited to, the amount of the receipt, the type of expense, the city in which the expense was incurred, the type of currency or credit used to pay for the expense, and any other relevant information; and if necessary for expense reporting purposes, separating the pages with the attached receipts 34b from the expense diary 10 by tearing along the perforated edge 26a, 26b. Submit the detached pages with the expense summary to the accounting department or the department that processes expense reports.

Conclusion, Ramifications, and Scope

Accordingly, the reader will see that the expense receipt diary can be used to conveniently and securely collect individual tickets or receipts, to categorize and keep information pertaining to said receipts, and to easily detach the pages from the expense diary in order to submit said receipts to the appropriate department for processing of an expense report. In addition, because the receipts are attached to a standard size page, the department processing the expense report will not need to handle each receipt individually, which allows the processor of the expense report to be able to photocopy several receipts at once and to be able to store said receipts in standard size filers or binders. Furthermore, the expense receipt diary has additional advantages in that for example:

(a) it provides an expense activity diary which complements the practice of attaching receipts to standard size sheets of paper in order to submit these receipts, along with an expense summary, to the accounting department for processing;

(b) it does not require the use of a secondary process or product, in addition to the product of my invention, for collecting, categorizing, and submitting receipts;

(c) it permits production of the diary in a variety of colors, shapes and sizes;

(d) it is lightweight and convenient to carry; and (e) it is simple to use and inexpensive to manufacture.

While my above description contains specificities, these should not be construed as limitations on the scope of the invention, but rather as an exemplification of one preferred embodiment thereof. Many other variations are possible. For example, the covers may be any material such as paper, cardboard, plastic, metal, etc.; the expense diary may have other shapes, such as circular, oval, trapezoidal, triangular, etc.; the binding may be binding with metal rings, spiral rings, plastic rings, staples, nuts and screws, adhesive material, book binding, or no binding at all; the interior pages may be any weight of paper or card stock; the release liner may be any material and any shape; the adhesive may be made of other materials such as glue, double-sided tape, etc. Also, for decorative, aesthetic, or marketing appeal, the covers or the interior pages of the expense receipt diary may be printed or embossed with an ornamental design, name, logo or other type of mark.

Thus the scope of the invention should be determined not by the embodiment(s) illustrated, but by the appended claims and their legal equivalents.

I claim:

1. A combination of at least one business expense receipt and an expense diary or notebook to conveniently and securely collect, record, and tabulate said at least one business expense receipt, ranging in size from small stubs to full size sheets of paper, and to categorize and keep information pertaining to said at least one business expense receipt, said combination comprising:

at least one business expense receipt;

a front cover and a back cover; and a plurality of interior pages secured together between said front and back covers by binding at one edge that allows said front and back covers and said plurality of interior pages to be freely turned, each page in said plurality of interior pages having a front side, a back side, a height, and a width and comprising:

a plurality of adhesive strips disposed on said front side, wherein each one of said plurality of adhesive strips is separate from each other and comprises a release liner and an underlying adhesive having vertical and horizontal dimensions substantially smaller than said height and said width of said interior page, respectively; and a form for recording business information printed on said back side, wherein said at least one business expense receipt can be attached to at least one of said underlying adhesives of said plurality of adhesive strips and information pertaining thereto may be recorded on said form.

2. The combination of claim 1, wherein said at least one business expense receipt is one of at least two business expense receipts, at least two business expense tickets, and a combination of one of each of said business expense receipt and said business expense ticket.

3. The combination of claim 1, wherein said horizontal said corresponding vertical dimension.

4. The combination of claim 1, wherein said form is at least two forms, said back side has a surface, and said at least two forms are printed substantially over the entirety of said surface of said back side.

5. The combination of claim 1, wherein said form for recording business information comprises at least one of a plurality of business data entry fields, checkboxes for categorizing said at least one business expense receipt, and checkboxes for categorizing a payment method, and wherein further each one of said plurality of business data entry fields is labeled with at least one of a receipt amount label, a date label, a foreign exchange rate label, a note label, a list of attendees label, and a list of companies label.

6. The combination of claim 1, wherein each one of said plurality of interior pages further comprises a perforated line disposed along an edge thereof near said binding for individually separating each one of said pages from said diary or notebook.

7. The combination of claim 1, wherein each of said plurality of interior pages and said front and back covers further comprise a plurality of binder holes pre-punched along one edge of said interior pages and said covers.

8. The combination of claim 4, wherein said at least two forms comprise at least four forms.

9. The combination of claim 8, wherein said at least four forms are equal to each other and comprise a listing of business expense categories.

10. The expense diary or notebook of claim 5, wherein said checkboxes for categorizing said at least one business expense receipt are labeled with at least one of an airfare label, a hotel label, a telephone label, a taxi/bus/train label a tips label, a car/limo label, a mileage label, a parking label, a gas label, an entertainment label, a laundry label, a personal label, a postage label, a seminar/conference fee label, a supplies label, a gifts label, a miscellaneous/other label, and a personal and/or business meal label.

* * * * *